United States Patent [19]

Samiran et al.

[11] 3,854,833
[45] Dec. 17, 1974

[54] EXPANDABLE RING CONNECTING DEVICE

[76] Inventors: David Samiran, 148 Northwest Rd.; Arthur H. Moore, 46 Northwest Rd., both of Westfield, Mass. 01085

[22] Filed: Dec. 11, 1973

[21] Appl. No.: 423,738

[52] U.S. Cl.............. 403/377, 403/322, 403/343, 285/321
[51] Int. Cl............................................. F16b 7/04
[58] Field of Search .......... 403/321, 322, 343, 344, 403/351, 352, 377; 285/321, 305, 308, 196, 338, 346; 239/2 R

[56] References Cited
UNITED STATES PATENTS

| | | | |
|---|---|---|---|
| 1,711,986 | 5/1929 | Borough | 403/DIG. 8 |
| 1,852,339 | 4/1932 | Sheets | 403/DIG. 8 |
| 1,926,798 | 9/1933 | Baumbach | 279/2 X |
| 3,064,503 | 11/1962 | Fry | 403/DIG. 8 |
| 3,071,398 | 1/1963 | Henning | 285/321 X |
| 3,301,108 | 1/1967 | Heiner | 279/2 X |

*Primary Examiner*—Jordan Franklin
*Assistant Examiner*—Wayne L. Shedd
*Attorney, Agent, or Firm*—Albert L. Jeffers; Roger M. Rickert

[57] ABSTRACT

A connecting device for connecting a member such as a shaft to another member in surrounding relation thereto in which the shaft is formed with an annular groove in which a split metal ring formed of spring wire is mounted. The shaft carries an actuating member for expanding the wire ring whereby the wire ring will grippingly engage the surrounding member. The groove may be formed in the shaft but, preferably, is formed in a device which can be attached to the shaft or it is formed partly in the shaft and partly in another member which is secured to the shaft. When the groove is formed in separable members, the groove can be smaller at the radially outer, open, side than inwardly therefrom whereby a split wire ring placed in the groove will be captive therein.

14 Claims, 8 Drawing Figures

EXPANDABLE RING CONNECTING DEVICE

The present invention relates to connecting devices and is specifically concerned with a connecting device utilizing a split wire ring.

There are many cases which a shaft or the like is to be connected to a member in surrounding relation thereto. Keys and the like are often employed for effecting such connections and the present invention is concerned with a connecting device which will carry out the functions of a key but which operates in a different manner and does not require the use of keys and keyways, and the like.

An object of the present invention is a provision of a novel connecting device in which a split wire ring is utilized for effecting connection between a member on which it is mounted and another member surrounding the member on which the wire ring is mounted.

A further object of the present invention is the provision of improved actuating means for actuating the split wire ring into expanded locking or connecting position.

The foregoing objects, as well as still other objects and advantages of the present invention, will become more apparent upon reference to the following detailed description taken in connection with the accompanying drawings in which.

BRIEF SUMMARY OF THE INVENTION

According to the present invention a member is provided with an annular groove therein in which a split metal ring is mounted. The metal ring is preferably formed of round spring steel wire and is advantageously held captive in the groove by forming the radially outer open side of the groove to a smaller dimension than the diameter of the wire while the groove inwardly from the open side thereof is large enough to receive the full diameter of the wire.

The member in which the groove is formed is provided with a plunger having a tapered outer end disposed between the opposed ends of the wire ring and actuating means are provided on the member for moving the plunger radially outwardly thereby to expand the diameter of the wire ring and to cause it grippingly to engage a member placed in surrounding relation thereto. The wire ring may additionally be held against the circumferential movement in the groove by a stop member engaging the wire ring at a point spaced from the ends thereof.

DETAILED DESCRIPTION OF THE INVENTION

Figure 1:
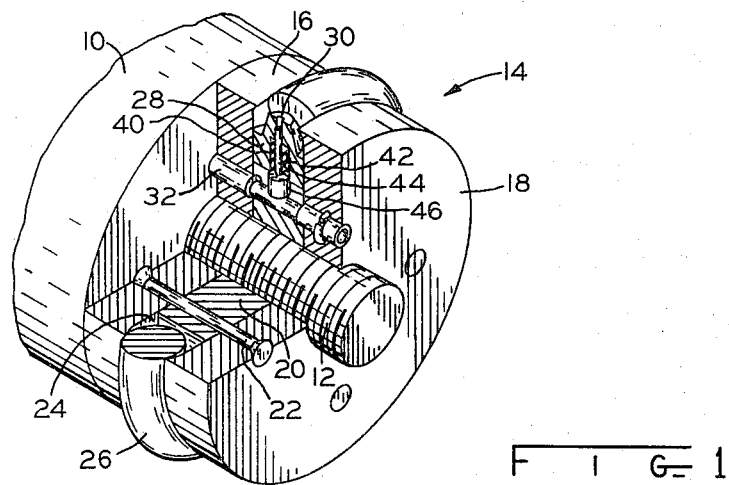
FIG. 1 is a perspective view showing one form of the connecting device according to the present invention.

Referring to the drawings more in detail, in FIG. 1, 10 represents a shaft having a threaded stud 12 projecting outwardly from the end thereof. Mounted on threaded stud 12 is a connecting device, generally indicated at 14, and consisting of a first member 16 on the shaft side and a second member 18 on the opposite side. A smaller diameter member 20 is interposed between members 16 and 18 and the three members are fixedly interconnected as by bolts or rivets 22. The three members form a groove 24 open on the radially outer side and in which is disposed a split wire ring 26. As will be seen in FIG. 2, the members 16 and 18 are so formed that the radially outer open side of the groove 24 is more narrow that the diameter of the wire making up the split ring 26 so that the split ring 26 is captive in the groove while still being able to protrude radially outwardly from the groove. The narrowed mouth of the groove also holds the wire ring so that the amount of protrusion of the wire ring is not too great to permit it easily to enter a hole in a member to be gripped by the wire ring.

The wire from which the split wire ring is formed is preferably steel spring wire and is of a size fairly closely what will fit within groove 24. The wire has sufficient cross section to display the necessary strength for the loads to be placed thereon.

Interposed between the opposed ends of the wire ring 26 is a plunger 28 having an inwardly tapering outer end portion 30 and being radially movable in a bore provided therefor. At the radially inner end of plunger 28 is an actuating means 32 which, in the case of the FIGS. 1 and 2 modification, comprises a rod-like element having an eccentric portion 34 in the plane of the plunger 28 so that rotation of element 32 will move the plunger 28 radially to cause the wire ring 26 to expand. The element 32 is held in position by a snap ring 36 mounted thereon which engages the corresponding groove 38 in member 18 when element 32 is pressed axially into the bore provided therefor.

Figure 2:
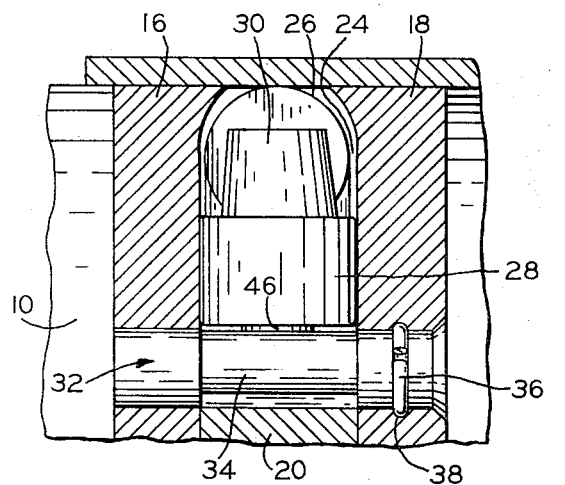
FIG. 2 is a fragmentary enlarged section through the device in FIG. 1 showing the wire ring expanding plunger and the actuating device for the plunger.

Outward movement of plunger 28 will expand ring 26 into gripping relation with a surrounding member, such as the tube 29 in FIG. 2. The resilient engagement of the plunger with actuating element 32 permits the element to be turned to a centered position so it will stay in locking position.

Figure 5:
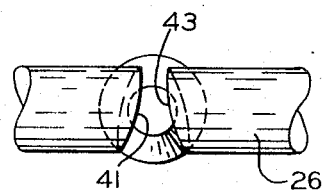
FIG. 5 is a fragmentary view showing one manner in which the ends of the split wire ring can be formed.

As will be seen in FIG. 5, the opposed ends 41 and 43 of the split wire ring 26 may be so inclined as to converge in one direction in the axial direction and this is of benefit in assembly and disassembly of the connecting device with the hole in a member of which is to be engaged thereby.

As will be seen in FIG. 1, plunger 28 has a bore 41 extending into the radially inner end thereof in which is mounted a block 43 of resilient rubber-like material. A rod 44 extends through or into the block of rubber-like material and has a head 46 on the radially inner end small enough to be received in bore 41 and interposed between the radially inner end of block 43 and the eccentric portion 34 of actuating element 32.

Figure 3:
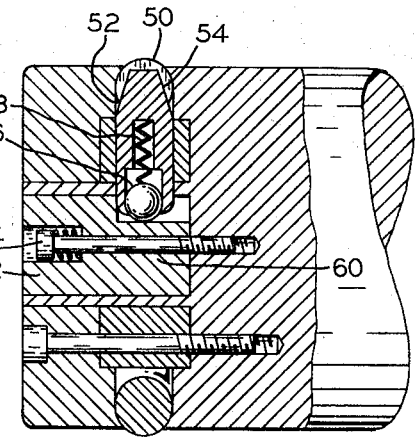
FIG. 3 is a sectional view showing a modified form of the device.

In FIG. 3, the split metal ring 50 is mounted in a groove 52 and an actuating plunger 54 is provided which, at the radially inner end carries a ball 56 biased by a spring 58. Ball 56 is engaged by the eccentric region 60 of a member 62 which is rotatedly supported by a screw 64.

Figure 4:
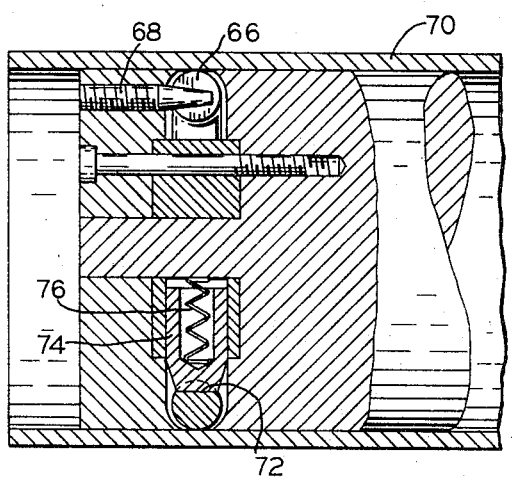
FIG. 4 is a sectional view showing still another form of the device.

In FIG. 4, the split metal ring 66 has an actuating element in the form of a screw 68 with a tapered end which is interposed between the opposed ends of split ring 66. Adjustment of screw 68 will cause the split ring 66 to expand into gripping relation with the surrounding member, such as the tube 70. In FIG. 4, at a point along split ring 66 spaced from the ends thereof, the ring is provided with a notch 72 which is engaged by a plunger 74 biased radially outwardly by a spring 76. Plunger 74 prevents circumferential shifting of split ring 66 in its groove.

Figure 6:
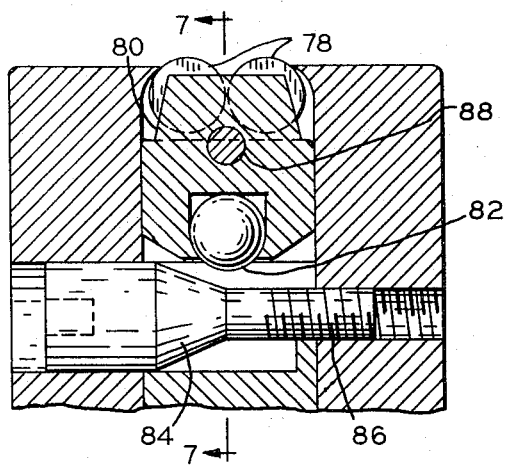
FIG. 6 is a fragmentary sectional view showing another form of the device.
Figure 7:
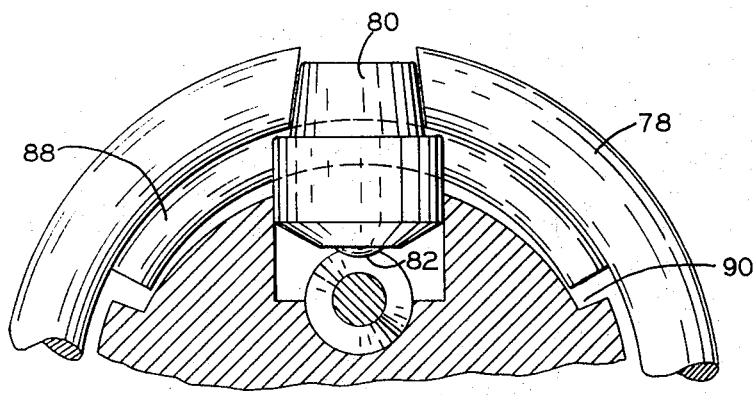
FIG. 7 is a section indiciated by line VII—VII on FIG. 6.

FIG. 6 shows a double wire ring 78 which is split and between the opposed ends of which there is interposed a plunger 80 having a tapered outer end and having a ball 82 at the radially inner end adapted for engagement by tapered, or conical, region 84 on a clamp screw 86. The plunger 80 has connected thereto an arcuate spring 88 which, as will be seen in FIG. 7, extends in both directions from the plunger along the groove for the split wire ring. The groove may be recessed, as at 90, to accommodate the spring 88 if necessary. The spring 88 could also be in the form of a flat leaf-like spring if so desired.

Figure 8:
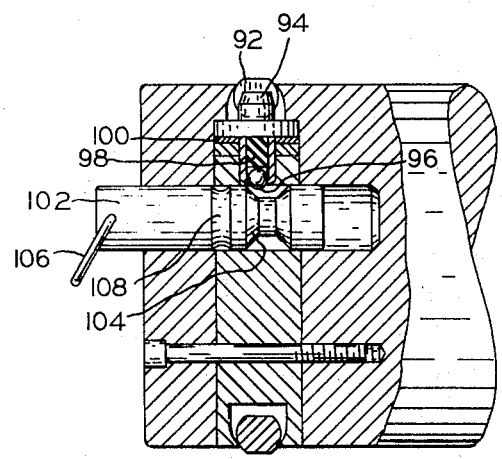
FIG. 8 is a sectional view showing still another form of the device.

FIG. 8 shows an arrangement in which the split wire ring 92 is provided with an actuating plunger 94 having a ball 96 at the radially inner end backed up by a block 98 of resilient rubber-like material. The plunger 94 in Figure may be provided with a leaf-like retaining spring 100 arranged in the same manner as spring 88 of FIGS. 6 and 7.

The actuating element in FIG. 8 is in the form of a reciprocable member 102 having at least one tapered, or conical, region 104 thereon engageable with ball 96. The reciprocable member 102 is adapted for being moved in the direction of its length as by a finger loop 106 connected to the outer end thereof. When member 102 is pushed completely to the right, ball 96 will be caused to ride up tapered region 104 to move plunger 94 into locking position. Thereafter, a little further movement of member 102 will cause ball 96 to drop into annular groove 108 provided in reciprocable member 102 and detain the reciprocable member in locking position.

All of the connecting devices described above can be formed of three members stacked together as shown in FIG. 1 or the device can be formed by shaping the end of the shaft so that it performs the function of member 16 and then connecting to the shaft the members 18 and 20. In such a case, the operation of the device will remain the same with the split wire ring being expandable into gripping relation with a surrounding member and being releasable for releasing the surrounding member from fixed engagement with the member carrying the wire ring.

Modifications may be made within the scope of the appended claims.

What is claimed is:

1. In combination; a cylindrical member, a radially outwardly opening annular groove in said member, at least one split ring of stiff wire in said groove having the ends thereof in opposed relation, radial plunger means in said member having a radially outer end portion disposed between and in engagement with the opposed ends of said wire ring, said radially outer end portion of said plunger means tapering inwardly in the radially outer direction, and actuating means moveably carried by said member and operatively engaging the radially inner end of said plunger means and adjustable for moving said plunger means radially outwardly in said member to cause said radially outer end of said plunger means to force said ends of said wire ring away from each other and thereby expand the diameter of said wire ring, said wire ring protruding radially outwardly from said groove in at least the expanded condition thereof.

2. The combination according to claim 1 which includes resilient means interposed between said actuating means and said plunger means.

3. The combination according to claim 1 in which said actuating means comprises an element rotatable in said member and having an eccentric region in the plane of said plunger means.

4. The combination according to claim 1 in which said actuating means comprises a rod-like element having an axis perpendicular to and intersecting the axis of said plunger means and moveable in said member in the axial direction of the element, and having a tapered region engageable with the radially inner end of said plunger means.

5. The combination according to claim 4 in which said element has screw threaded engagement with said member and is rotated to effect movement thereof in said member.

6. The combination according to claim 4 in which said element is reciprocable in said member in the axial direction of said element.

7. The combination according to claim 6 which includes a detent resiliently supported on the radially inner end of said plunger means and engaging said element, said element having an annular recess therein near the larger diameter end of the said tapered region thereof for receiving said detent.

8. The combination according to claim 1 which includes a stop element carried by said member and engaging a point along said wire ring spaced circumferentially from the said ends thereof and holding said wire ring against circumferential movement in said groove.

9. The combination according to claim 1 in which said wire ring is formed from steel spring wire.

10. The combination according to claim 1 in which said wire ring is formed from steel spring wire and said groove at the radially outer open side has a width slightly less than the diameter of said wire whereby said wire ring is captive in said groove while protruding radially therefrom.

11. The combination according to claim 1 in which the said ends of said wire ring are shaped to conform to the taper on the radially outer end of said plunger means.

12. The combination according to claim 1 in which the said ends of said wire ring when viewed in the radial direction of said plunger means are inclined so as to converge toward the axial plane of said plunger means in one direction.

13. The combination according to claim 1 which includes arcuate spring means connected to said plunger means and extending in opposite directions therefrom along said groove.

14. The combination according to claim 1 in which said plunger means has an axial bore extending therein from the radially inner end, a block of similar rubber-like material in said bore, and a rod extending axially into said block and having a head at the radially inner end not larger than said bore and engaging said actuating means.

* * * * *